United States Patent

Bock et al.

[15] 3,654,621

[45] Apr. 4, 1972

[54] INFORMATION PROCESSING SYSTEM HAVING MEANS FOR DYNAMIC MEMORY ADDRESS PREPARATION

[72] Inventors: Robert V. Bock; Frederick Rehhausser, both of Malvern; Elmer Dean Earnest, Downingtown; Frederick H. Gerbstadt, Berwyn; James A. White, West Chester, all of Pa.

[73] Assignee: Burroughs Corporation, Detroit, Mich.

[22] Filed: Nov. 28, 1969

[21] Appl. No.: 880,537

[52] U.S. Cl. ..........340/172.5

[51] Int. Cl. ..........G06f 9/10

[58] Field of Search ..........340/172.5; 235/157

[56] References Cited

UNITED STATES PATENTS

| | | | |
|---|---|---|---|
| 3,303,477 | 2/1967 | Voigt | 340/172.5 |
| 3,331,056 | 7/1967 | Lethin et al. | 340/172.5 |
| 3,337,854 | 8/1967 | Cray et al. | 340/172.5 |
| 3,340,513 | 9/1967 | Kinzie et al. | 340/172.5 |
| 3,344,410 | 9/1967 | Collins et al. | 340/172.5 |
| 3,348,213 | 10/1967 | Evans | 340/172.5 |
| 3,351,917 | 11/1967 | Shimabukuro | 340/172.5 |
| 3,374,464 | 3/1968 | Brothman et al. | 340/172.5 |
| 3,461,433 | 8/1969 | Emerson | 340/172.5 |
| 3,461,434 | 8/1969 | Barton et al. | 340/172.5 |
| 3,470,537 | 9/1969 | Goshorn et al. | 340/172.5 |
| 3,510,847 | 5/1970 | Carlson et al. | 340/172.5 |

OTHER PUBLICATIONS

E. Bloch, The Engineering Design of the Stretch Computer, Proc. Eastern Joint Computer Conf., pp. 48- 58, Dec. 1959.
F. P. Brooks, Jr. et al., Processing Data in Bits and Pieces, IRE Trans. on Electronic Computers, Vol. EC- 8, No. 2, pp. 118-124, June, 1959.

*Primary Examiner*—Paul J. Henon
*Assistant Examiner*—Mark Edward Nusbaum
*Attorney*—Mervyn L. Young, Paul W. Fish and Charles S. Hall

[57] ABSTRACT

This disclosure relates to an information processing system having means to dynamically prepare memory addresses for any particular element in a field of variable length which field may reside in any portion of the systems storage. Each desired element is specified by a descriptor which contains all the information necessary for such specification and the system is provided with an evaluation section which is adapted to evaluate the descriptor to extract that information necessary to create the memory control word which is employed to address the system storage. Because of the dynamic nature of the descriptor evaluation or memory address preparation, absolute memory addresses need not be created until such time as they are required. Furthermore, the method and apparatus employed allow for the accessing of a hierarchy of nested structures within the system storage.

14 Claims, 18 Drawing Figures

Patented April 4, 1972 3,654,621

12 Sheets-Sheet 1

INVENTORS
ROBERT V. BOCK
FREDERICK V. REHHAUSSER
E. DEAN EARNEST
FREDERICK H. GERBSTADT
JAMES A. WHITE

BY [signature]
ATTORNEY

INVENTORS.
ROBERT V. BOCK
FREDERICK V. REHHAUSSER
E. DEAN EARNEST
FREDERICK H. GERBSTADT
JAMES A. WHITE
BY Mervyn L. Young
ATTORNEY Patented April 4, 1972 3,654,621

12 Sheets-Sheet 3

Patented April 4, 1972 3,654,621

12 Sheets-Sheet 8

INFORMATION PROCESSING SYSTEM HAVING MEANS FOR DYNAMIC MEMORY ADDRESS PREPARATION

This invention relates to an information processing system that is provided with a free field storage or memory units, and more particularly to such a system wherein operands and data segments can be of any size format whose addresses can be dynamically prepared.

BACKGROUND OF THE INVENTION

Large scale data processing systems find many applications for multi-programming including concurrent batch processing, real time processing and time sharing. In order to accommodate a number of such unrelated jobs or tasks, prior art systems have been provided with operating systems or control programs which supervise such activities as task sequencing, storage allocation, and the like. Also included in the operating system are the various compilers or language translators which allow the programmer to employ different programming languages that do not require knowledge of the circuit characteristics of the system. It will be appreciated that the type of tasks for which the machine is to be used will affect the operating system which in turn affects the design of the system itself. If the machine is designed to be job oriented then the supervisory program is geared to execute an incoming stream of programs and its associated input data. On the other hand, if the machine is designed for real-time or time sharing operations, the supervisory program views incoming pieces of data as being required to be routed to the number of processing programs. When the machine is designed for time sharing, then protection of different programs and related resources becomes important.

Although a single processor system may be multi-programmed, a greater degree of flexibility is achieved from a multi-processing system where a number of separate processes may be assigned to a plurality of processors. Examples of such multi-processing systems are disclosed in the Anderson et al., U.S. Pat. No. 3,419,849 and Lynch et al. U.S. Pat. No. 3,411,139. A central processor of the type employed in the Lynch et al patent is disclosed in Barnes et al. U.S. Pat. No. 3,401,376. Each of the above mentioned patents is assigned to the assignee of the present invention.

The above described systems employ operating systems which were designed for multi-processing systems. A particular distinction of the present invention is that the processor module employs circuitry to evaluate system instructions at a faster speed than previously accomplished. More importantly, the operating system of the present invention and the circuitry adapted to implement that system are designed to provide an architecture to more readily accommodate multi-task processing including time sharing applications as well as real time applications and batch data processing.

It is particularly advantageous to have system programs such as service programs which are recursive or reentrant in nature. Furthermore, it is advantageous that such recursiveness exists in a heirarchy of levels and not just one level. Furthermore, it is advantageous and even necessary that certain of the system programs as well as the user programs be protected in memory from unwarrented entry by unrelated processes being carried out elsewhere in the system. Still another characteristic which is advantageous is that of providing functions common to various source languages which functions are implemented in circuitry where possible to provide faster execution times.

Various programming languages or source languages have been devised which allow the user to write programs without specific knowledge of the machine language which the system employs. Among the various programming languages which have been devised are Fortran, Cobol, Algol and PL/1. A particular problem in devising compilers or translators for the source languages is that of a difference not only in the type of operators to be employed but also in their instruction formats as well as in the data structures involved. Such structural format differences and operator requirements occur in part because of the different memory organizations that are designed for different processing systems. Thus, if one system were particularly adaptable for employing a particular programming language, it would not necessarily be as readily adaptable for another programming language. Therefore, it would be desirable to have a memory organization which is free of any internal structure and which can accommodate data and instruction segments of an almost infinite variety of sizes. Not only does such a structure free memory accommodate different sized information segments, but it also allows for greater data compaction.

It is impractical to build a completely bit addressable memory, and memories are designed to be word or byte oriented. Prior art memories have been designed to be able to store and fetch to or from any selected byte location in a word oriented memory. However, this still does not allow for selection of a field of any size larger or smaller than a byte, which field can start at any selected bit location. This is particularly advantageous in accommodating different problem solutions for which various program languages and data formats have been designed.

In processing any large data base problems, much processing time in prior art computers has been devoted to the preparation of indirect addresses as required to access nested files and records as employed in reservation systems and the like. It is therefore advantageous to transfer memory address preparation to the processing module rather than requiring programs to handle this chore.

It is therefore an object of the present invention to provide an improved multi-processing system for such diverse applications as time sharing, scientific problem solving and other data processing tasks.

It is still another object of the present invention to provide an improved multi-processing system that can handle complex data structures which may be both nested and composed of variable type and length elements.

It is still another object of the present invention to provide a multi-processing system that may readily accommodate the sophisticated program structures dictated by present and future source languages.

RELATED U.S. PATENT APPLICATIONS

U.S. Pat. applications directly or indirectly related to the subject application are the following:

Ser. No. 880,536 filed Nov. 28, 1969 by F. V. Rehhausser, et al. and titled "Information Processing System Implementing Program Structures Common to Higher Level Program Languages,"

Ser. No. 880,535 filed Nov. 28, 1969 by A. J. DeSantis, et al. and titled "Information Processing System Having Free Field Storage for Nested Processes,"

Ser. No. 9,275 filed Feb. 6, 1970 by J. C. Trost, et al. and titled "Autonomous Multiple-Path Input/Output Control System."

SUMMARY OF THE INVENTION

In order to access nested fields, records and other structures, it is desirable to address desired elements according to the parent structure in which the elements reside.

It is a feature of the present invention to dynamically prepare memory addresses for any particular element in a field of variable length which field may reside in any portion of the system's storage. Each desired element is specified by a descriptor which contains all the information necessary for such specification and the system is provided with an evaluation section which is adapted to evaluate the descriptor to extract that information necessary to create the memory control word which is employed to address the system storage. Because of the dynamic nature of the descriptor evaluation or memory address preparation, absolute memory addresses need not be created until such time as they are required. Furthermore, the method and apparatus employed allow for the accessing of a hierarchy of nested structures within the system storage.

DESCRIPTION OF THE DRAWINGS

The above and other objects, advantages and features will become more readily apparent from a review of the following description in relation with the drawings wherein.

GENERAL DESCRIPTION OF THE SYSTEM

Multi-processing systems, as well as multi-programming systems, can be viewed as a series of related or unrelated programs, tasks or jobs which hereinafter will be called processes. An elementary process is a serial execution of operators by a single processor. A process may be partitioned into subprocesses or may be part of a parent process. In this way a process hierarchy can be established. The term "process" may be defined as an association between a processor and address space. The address space is the set of all storage that is acceptable by that process. All the available storage space in the system can be viewed as holding a global process which is the ancestor of all other processes and subprocesses in the system. Such a global process can be viewed as including the entire operating system with supervisory programs, service programs and compilers as well as the various user programs.

The address space of the system of the present invention extends over all the levels of storage including the main store and a back up store as well as peripheral devices. This system is, of course, provided with a plurality of processors each of which is provided with a resource structure in memory to store the definition of a new work space or spaces. This resource structure, which will be described in more detail below, permits each processor to keep track of the relation between the entire global process space (the memory or storage) and the particular process space with which it is currently associated.

The process resource structure is the mechanism used to pass all resources between processes of the process hierarchy and, therefore, it is an integral part of the resource protection scheme as required for protection of different user programs during time sharing as well as for protection of the different processes in general. As a particular processor moves from a parent process to a subprocess, allocated resources are stacked in the processor's resource structure and are removed from the process resource structure when the processor moves from the subprocess back to the parent process. In this way, the resource structure contains all of the dynamically allocated resources which its processor might require for any particular subprocess. A particular system management process is the only process which may directly access entries into each of the resource structures.

Figure 1:
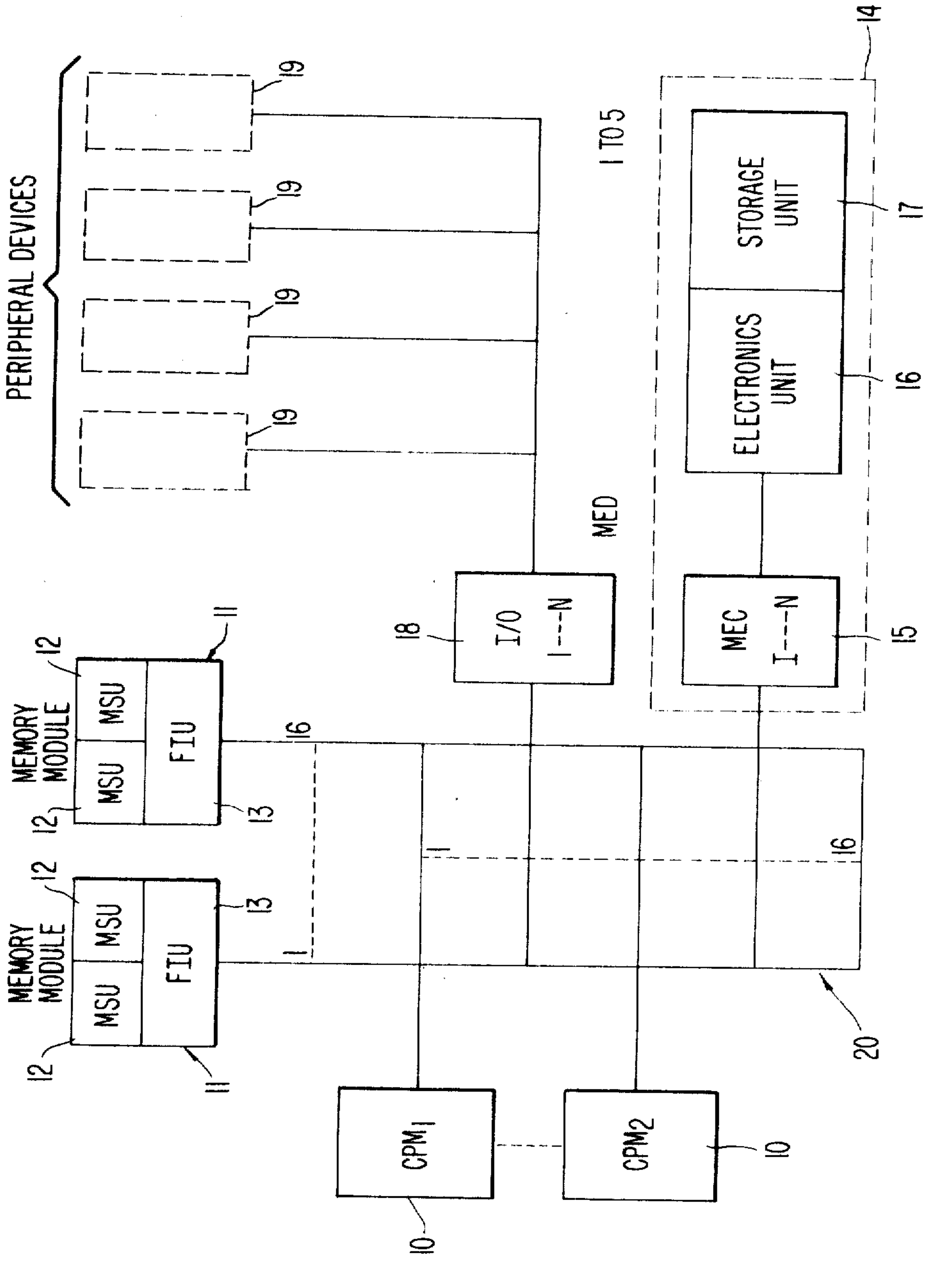
FIG. 1 is a schematic representation of a system of the type employing the present invention.

By generally describing the process architecture in the manner above, one has also generally described the manner in which the various levels of storage are employed. A brief description will now be given of the system of the present invention adapted to utilize such process architecture. Referring now to FIG. 1, there is shown therein a general representation of the type of system embodying the present invention. This system includes a plurality of central processor modules 10 and one or more I/O control modules 18 which along with back up memory 14 are connected to a plurality of memory modules 11 by way of a switch interlock 20. Each of the memory modules 11 is comprised of two memory storage units 12 and an isolation unit 13 the function of which will be more thoroughly described below. Back up memory 14 is comprised of memory extension controller 15 and a plurality of units 16 and 17 which may include registers, core storage or disc files. Back up memory 14 will hereinafter be referred to as level-2 memory. One or more of the I/O controllers 18 are employed to establish communication to the plurality of peripheral devices 19.

The organization as illustrated in FIG. 1 does not differ substantially from that disclosed in the above mentioned Lynch et al. U.S. Pat. No. 3,411,139. However, the system of the present invention does distinguish quite differently therefrom in the manner in which it employs the process hierarchy described above and in the manner in which the features of the present invention are adapted to employ that hierarchy.

The principle features of the present invention reside both in the manner in which the respective memory modules 12 are adapted to appear to the system as a free field storage and in the manner in which the respective processors 10 are adapted to utilize this storage to employ the process hierarchy described above.

Figure 2:
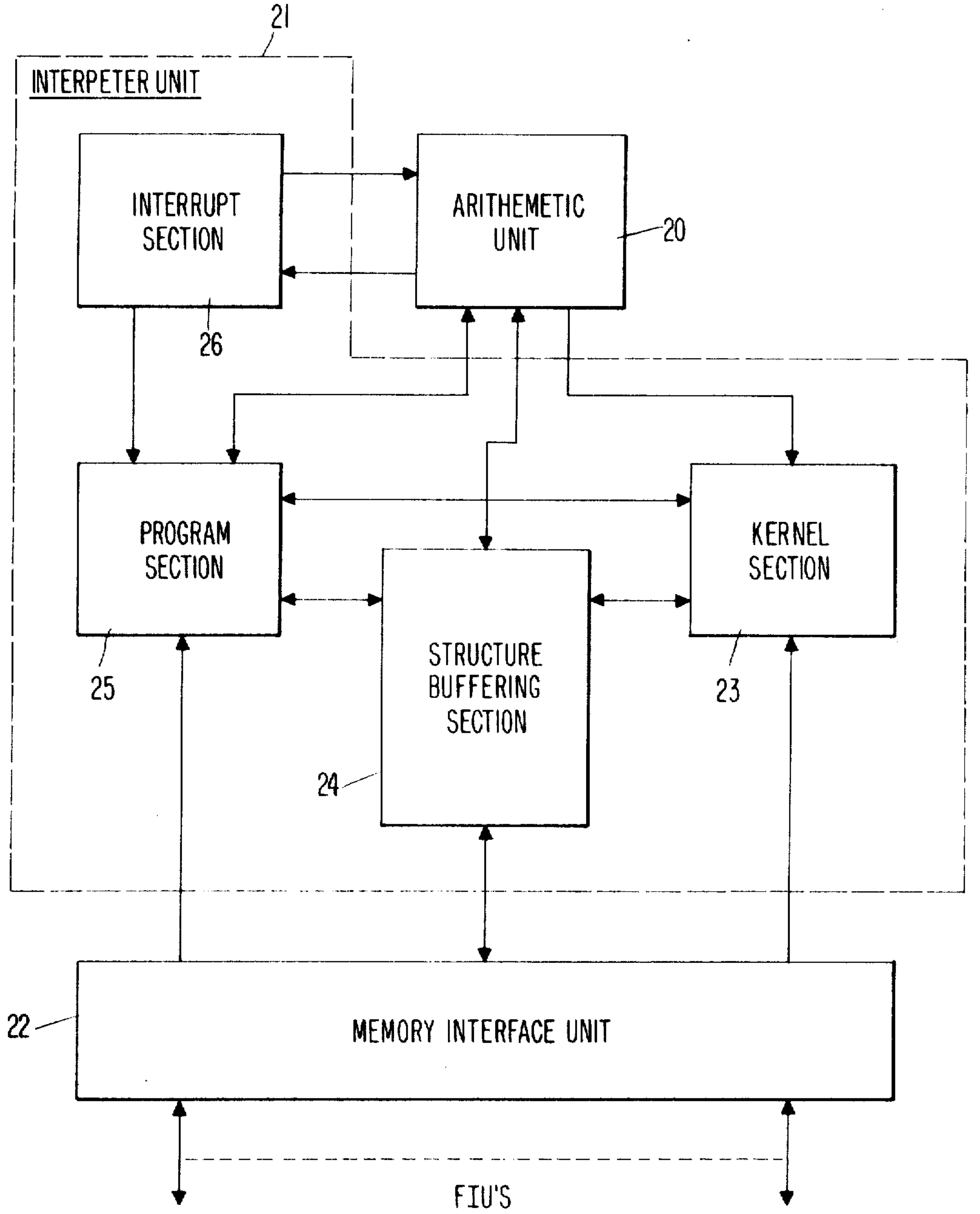
FIG. 2 is a schematic representation of a processor employed with the present invention.

The features of the processor will be first described generally in reference to FIG. 2. As illustrated in FIG. 2, interpreter unit 21 along with arithmetic unit 20 serves to form the system of processor 10 such as illustrated in FIG. 1. Memory interface unit 22 serves as the communication interface between interpreter 21 and the respective memory modules 11 of FIG. 1. Interpreter 21 is formed of four basic sections: kernel section 23, structure buffering section 24, program section 25 and interrupt section 26.

The main function of each processor 10 is to activate and deactivate processes, direct information transfers between modules, service interrupts and execute arithmetic calculations required by a program. These functions are performed under the direction of a master control program (MCP). The processor minimizes memory access times by utilizing phased fetches and stores where possible, and by associatively buffering information. Execution speeds are enhanced and hardware costs are minimized by the centralization of controls of the functionally independent subsections within the interpreter unit 21. Within each processor, it is interpreter 21 which controls the movement of program and data, provides automatic memory protection, responds to interrupts and controls, and empties and replenishes the various stacks and buffers within the processor.

Within the interpreter, program section 25 fetches, interprets and executes the program operators in the program string. Kernel section 23 fetches, interprets, executes and updates descriptors which are referred to by name in the program string according to the program operator being executed. Structure buffering section 24 consists of a set of local memories which buffer frequently accessed items in order to minimize level-1 (main store) fetches. The buffering is based on the structures used to define the processor. Interrupt section 26 receives interrupts and faults, examines them and passes the appropriate fault or interrupt signal to accomplish a change in program.

Interpreter unit 21, then, is designed to provide the processing control for the system by means of structure operators specifically designed for efficient management of data and program structures, and by means of program operators selected to allow easy implementation of higher level languages. The control information is distributed, as required, to the arithmetic unit and through the memory interface unit 22 to the memory module.

While the main memory or level-1 memory is adapted to appear to the system as being free field or without structure, the various processes and information segments stored therein will, of course, be structured. Descriptors are provided to designate or point to the various information structures in memory, and also describe such structures as well as their significance in relation to the process in which they reside or to the parent process if the structure itself is a subprocess.

Figure 4:
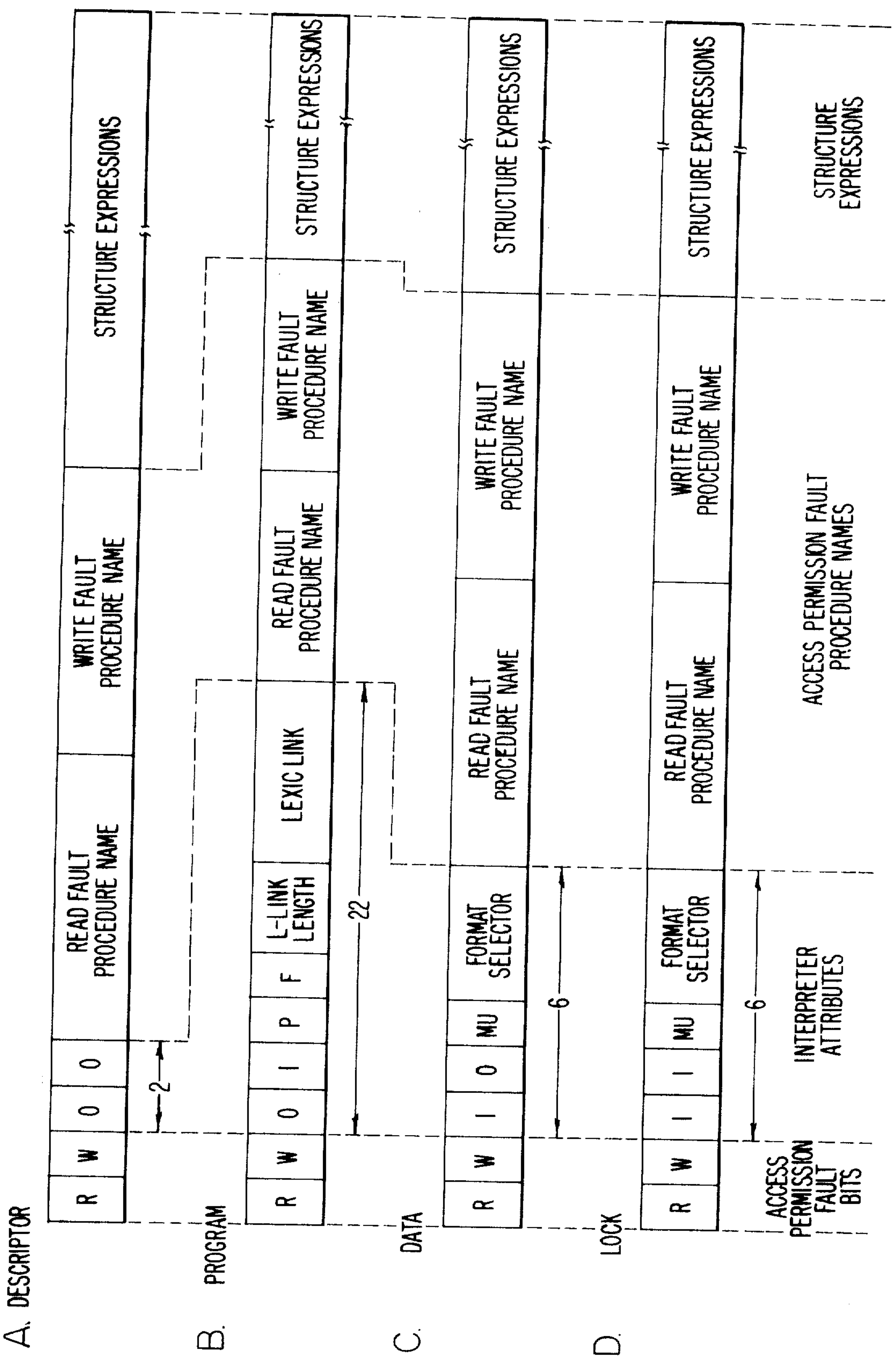
FIG. 4 is a representation of descriptor formats as employed with the present invention.

In this sense, accessing of all structured information in the various levels of memory involves an evaluation of descriptors which evaluation is performed by kernel section 23 as illustrated in FIG. 2. As illustrated in FIG. 4, there are four types of descriptor formats to respectively reference locked data fields, data objects, program segments or other descriptors.

Each of the descriptors contains three major information sets or expressions. These are referred to as the access attributes, interpreter attributes and structure expressions. The access attributes define protection capability and also specify whether an element referenced in memory can be stored or fetched. The interpreter attributes define the characteristics of that referenced element and the structure expression contains the type of structure within which the element resides and this defines the structure and structure parameter fields which give the parameters necessary for accessing that structure. It is to be noted in reference to FIG. 4, that each descriptor can contain as many structure expressions as are necessary to define a desired element.

Figure 5:
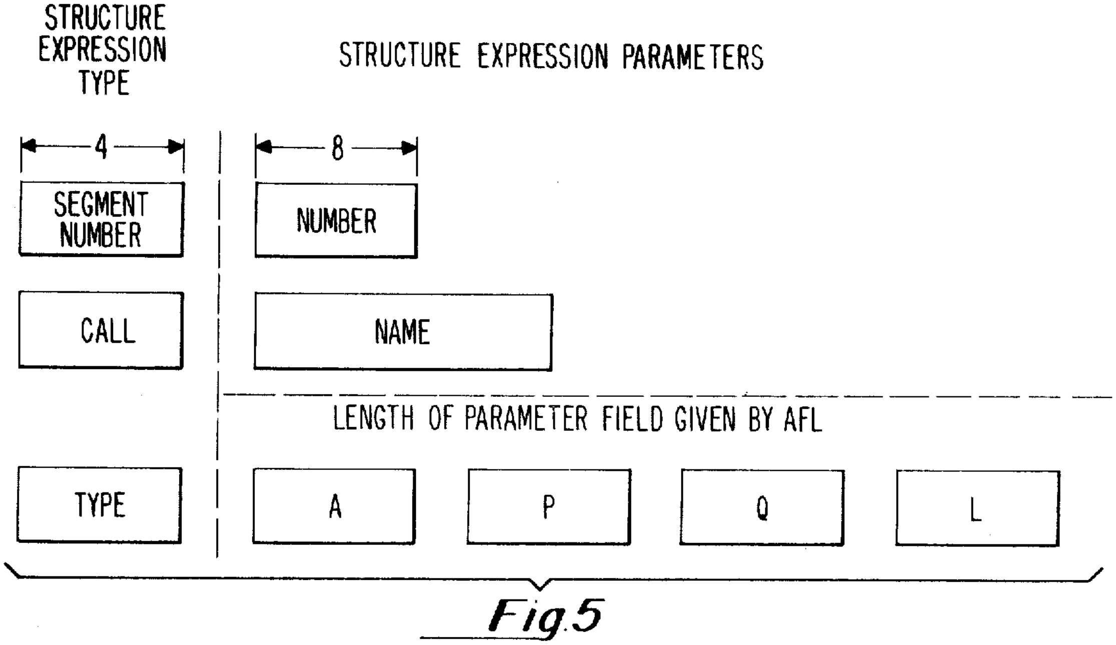
FIG. 5 is a representation of formats of structures expressions.
Figure 7:
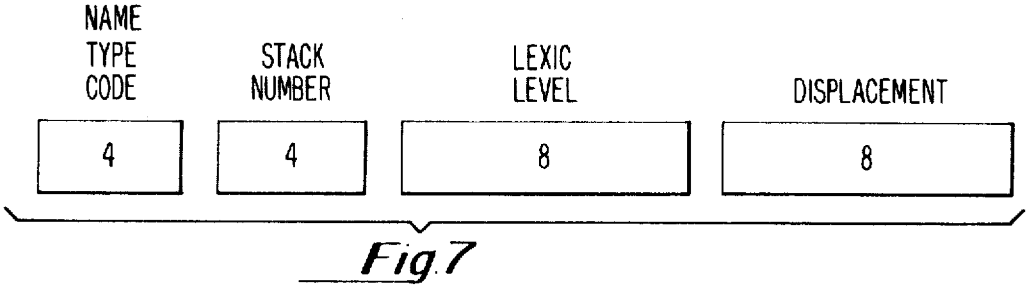
FIG. 7 is a representation of the name format.

The formats of the structure expression field are illustrated in FIG. 5. In addition to the general format, two particular structure expression types are illustrated which are the segment number and the call expressions. These are the only two structure expressions which have predetermined size. The segment number always has an eight bit index to access the resource stack as its parameter. The call expression always has a name as its parameter which is employed to reference descriptors. The descriptors, thus, have been generally described. It will be remembered that it is from the descriptor that a memory control word is created.

DETAILED DESCRIPTION OF THE INVENTION

A. Interpreter Kernel Section

Figure 3:
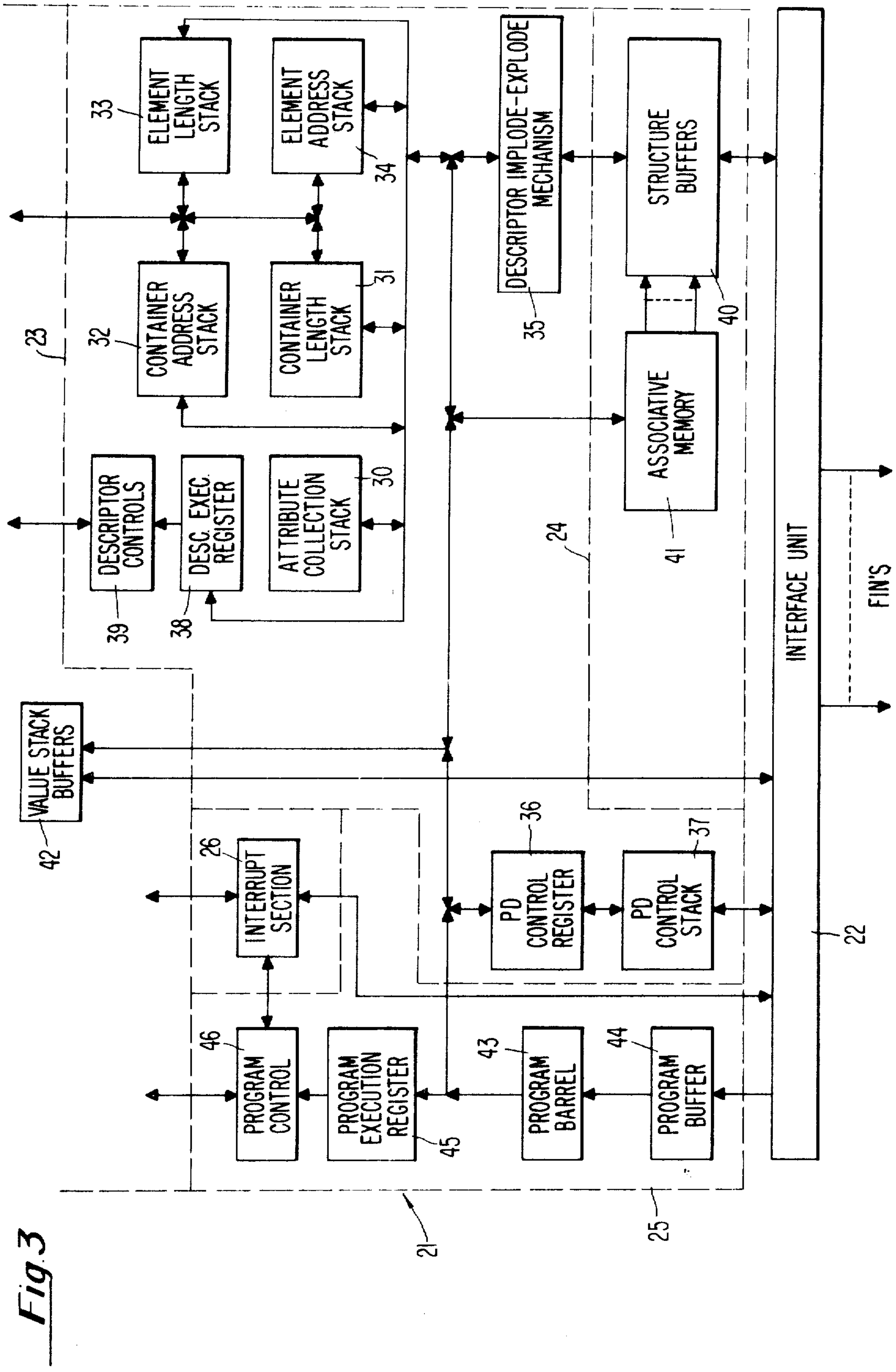
FIG. 3 is a schematic representation of the interpreter portion of the processor.

The reader is now referred to FIG. 3 which illustrates the circuitry employed by interpreter 21 and more specifically by kernel section 23 to evaluate the respective descriptors and structure operators. The kernel hardware includes five attribute stacks 30, . . . , 34; descriptor implode-explode mechanism 35; the program/descriptor control register 26; descriptor execution register 38 as well as descriptor controls 39 and program/descriptor control stack 37. Kernel section 23 receives data from structure buffers 40, value stack 42, program barrel circuit 43 and arithmetic unit 20 as illustrated in FIG. 2. Kernel section 23 sends data to structure buffers 40 and to arithmetic unit 20.

Evaluation of the various descriptors by kernel section 23 provides for the accessing of the various structured information in the respective levels of memory. The product of this evaluation is a reference which is referred to as the terminal descriptor. Particular element references in the structure depend upon the mode of evaluation of the descriptor and the evaluation parameters. The evaluation modes are those of enter, remove and construct and may be applied to all structures.

Evaluation begins with the execution of an evaluate operation which employs an empty terminal descriptor and a descriptor to be scanned by kernel section 23 during the evaluation operation. Each structure may refer to two fault procedures (one for read and one for write) determined during the evaluation if the fault procedure name is defined in the descriptor being scanned. This name is then moved to the terminal descriptor. The fault indicators are accordingly accumulated in the terminal descriptor.

The structure expression of the descriptor consists of an allocate bit followed by a sequence of structure instructions. If the allocate bit is false an immediate allocate fault occurs. Otherwise, the structure expression instructions are executed in order from left to right. Each instruction consists of an operation and a structure state.

The structure state contains address and length fields. The length of the fields in the structure state is specified by the address field length of the structure expression. The first instruction of the structure expression must define a segment number. This may be defined either explicitly with a segment instruction or with a call instruction of another structure which defines the segment number. The segment number is inserted into the segment instruction of the terminal descriptor.

Certain instructions may be mode-dependent and govern those structures in which allocation may occur. Accesses to mode-dependent instructions in the remove or enter mode will change the structure state for allocation or deallocation of an element respectively. Accesses to any structure in the construct mode have no effect on the structure state. In the case of mode-independent structures, enter and remove modes are equivalent to the construct mode. In structures with more than one mode-dependent instruction, the particular mode has the effect only on the first mode-dependent instruction. That is, if the structure has substructures in which allocation may occur, allocation can occur only in the innermost allocatable structure.

Each of the structures in memory can be thought of as being contained in address space defined by an address and a length. Thus, in the evaluation of structure expression, each instruction after the initial one in that expression operates on a container address in container address stack 32 of FIG. 3 and on container length in container length stack 31 in order to define a proper substructure within the container. A fault occurs if the subfield is not wholly contained in the container so defined. Unless otherwise specified, parameters required by certain instructions are found in the value stack which resides in memory and supplies values to value stack buffers 42 of FIG. 3.

In FIG. 3, attribute collection stack 30 then serves to collect access permission attributes, segment numbers and format selectors which are received from the various descriptors during evaluation. The other four stacks 31, . . . , 34 are used for structure expression parameter manipulation. Each stack consists of four words which are 32 bits long. The stacks interface with the arithmetic unit for all calculations. They also utilize and modify the structure expressions in the structure and descriptor buffer 40 and they receive parameters from the value stack by way of value stack buffers 42 and program barrel circuit 43. The stacks are manipulated individually. Two of the stacks hold container information (starting address and length) while the remaining two stacks hold element information (starting address and length). The respective stacks are so indicated in FIG. 3. During evaluation, the stacks will hold intermediate values of such containers for length information and self identifying structures. At the end of every structure type evaluation, the element stacks will be empty while the container stacks will have a partial reference to the object. The partial reference is a container address and a length corresponding to the point up to which the descriptor has been evaluated.

Continuing with description of the other circuits in kernel section 23, description execution register 38 retains the current descriptor structure expression type field in order that it may be used with information from the interpreter control section in determining the algorithm that is to be used by descriptor control section 39 in evaluation of the current structure expression. In conformity with the structure expression format of FIG. 5, the structure expression type is four bits long and thus, descriptor execution register 38 is also four bits in length.

Descriptor implode-explode mechanism 35 serves two functions. It is used to unpack fields in the various descriptors and to present each field to its appropriate destination. It also is used to update and repack fields from the various sources and to update descriptors.

Program/descriptor control register 36 and program/descriptor control stack 37 make up the program/descriptor control structure. PD control register 36 (PDCR) is 106 bits long and control stack 37 (PDCS) is made up of eight word locations each of which is 106 bits long. Stack 37 is the link to level-1 memory. This structure retains both program execution and descriptor evaluation history. Entry into a subroutine, procedure, function, or loop causes the program execution information in the PDCR to be pushed into the PDCS. The entry is then recorded in PDCR. A program branch replaces the present information in PDCR with a description of the branch. During descriptor evaluation, a structure expression of the type "call" causes the PDCR to be pushed into the PDCS. The call description is placed in the PDCR. Since the descriptor evaluation never changes program history, the descriptor evaluation history will always be on top of the program execution history in the PDCS.

Figure 8:
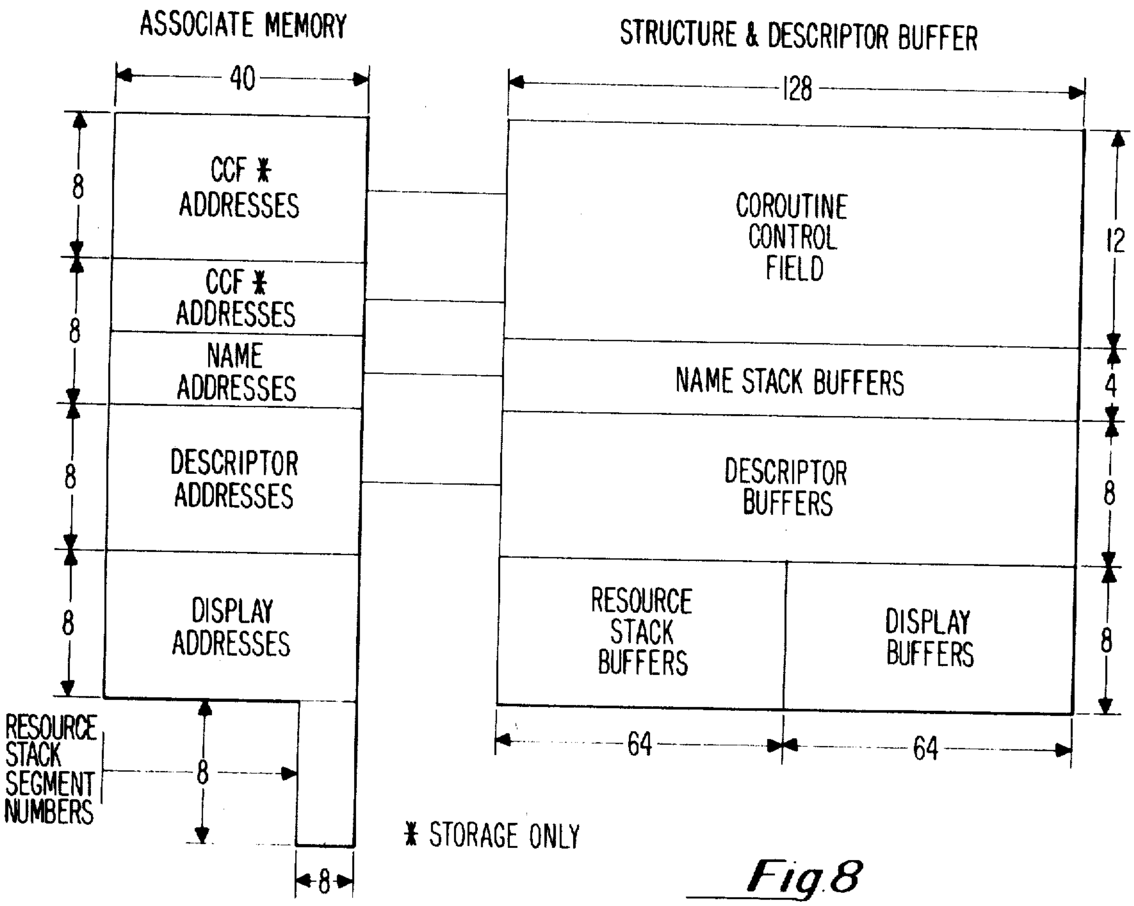
FIG. 8 is a representation of the organization of the structure buffers of FIG. 3.

The structure and descriptor buffers 40 and associative memory 41 are not directly a part of kernel section 23 hardware. However, they provide the kernel section with the descriptors that are to be evaluated. The buffer is a 32-word by 128-bit local memory. The buffer is divided into five areas: coroutine control field buffer, name stack buffers, descriptor buffers, resource stack buffers, and display buffers. The descriptor resource stack and display buffers have an associative memory in order to quickly reference captured entries. The coroutine field entries and name stack entries have their level-1 addresses stored in the associative memory for quick up-date. The organization of structure buffers 40 and associative memory 41 is illustrated in FIG. 8.

B. Interpreter Program Section

Having described the descriptor evaluation, program execution will now be described as formed by program section 25 of FIGS. 2 and 3. The program syllable currently being executed is pointed to by the contents of PD control register 36. This program syllable is a part of a program segment that is stored in the program buffer 44 which is a local associative memory. Program buffer 44 automatically refills itself when it senses that the program string will run out. Upon changes of direction in the program string caused either by procedure entry or branches, program buffer 44 is checked associatively to see if the beginning of the new program segment to be executed is already resident in program buffer 44. Nesting and unnesting of PD control register 36 for procedure entry and exit and loop control operators utilize PD control stack 37 which is another local memory. PD control stack 37 automatically links to level-1 memory for emptying and replenishing its contents.

Program operators are extracted from the program string by program barrel circuit 43 and placed in program execution register 45. Names (which were discussed above) are extracted from the program string by program barrel circuit 43 and placed into the attribute stack of structure buffers 40 for evaluation. Literals are extracted from the program string by program barrel circuit 43 and placed into value stack buffers 42 or name stack of structure buffers 40.

Figure 9:
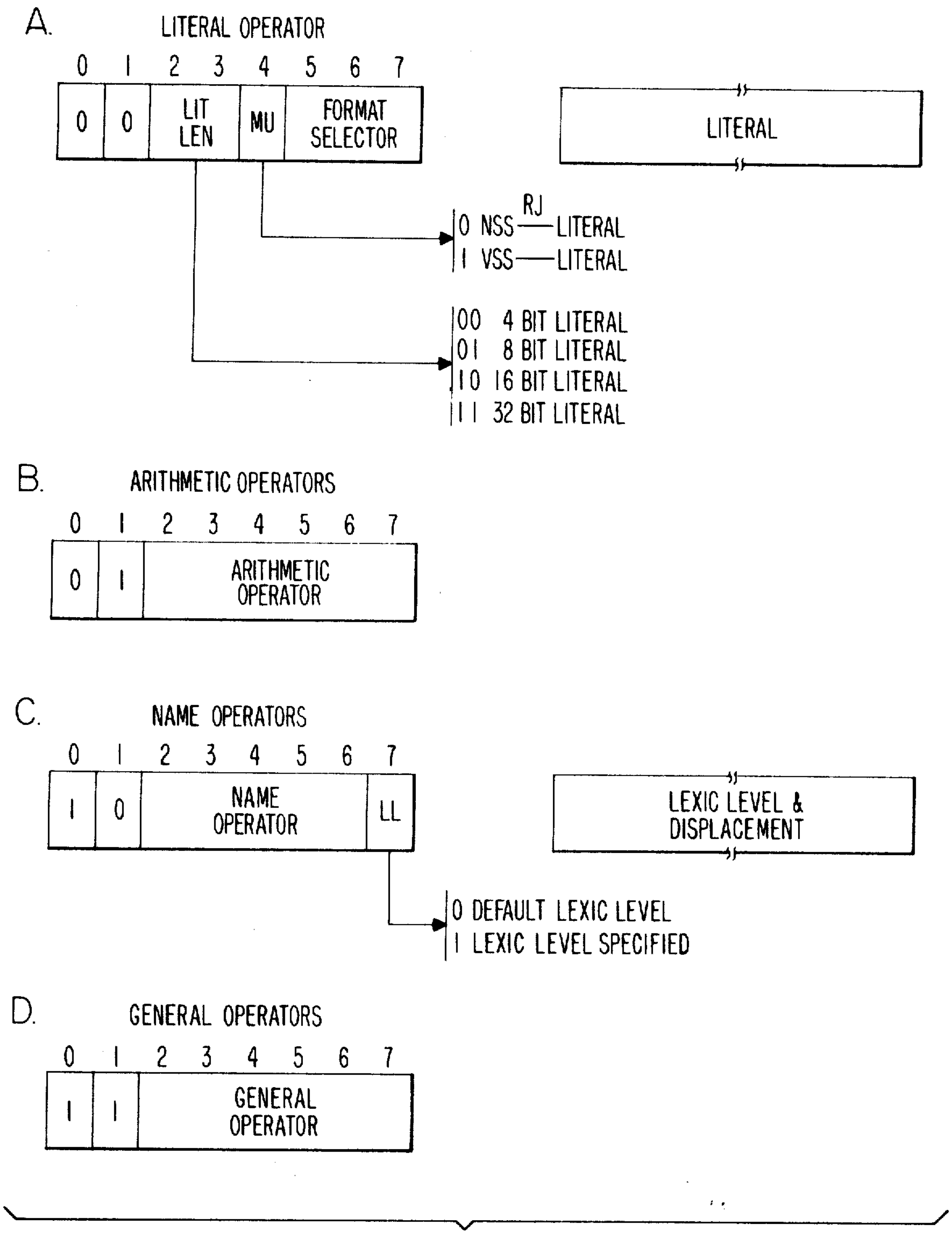
FIG. 9 is a representation of the program operator formats.

The respective program operators are of four general classes as illustrated in FIG. 9. These classes are: literal operators, arithmetic operators, name operators, and general operators.

As illustrated in FIG. 9, each class of operators starts with an eight-bit syllable. Literal and name operators can increase in four-bit increments to a maximum syllable size of 32 bits for name operators and 40 bits for literal operators. The first two bits of the operation code define which class of operator the program syllable contains. If the program syllable contains a literal operator, the next two bits define the size of the literal. The literal may be four, eight, 16 or 32 bits in length. The next four-bit group of the literal syllable defines the destination and arithmetic format of the literal. The first bit of this group defines whether the literal is to be entered into the name stack or into the value stack. The remaining three bits contain the format selector which is used as an index to the arithmetic format vector. This selection gives the arithmetic format of the literal. The remainder of the program syllable contains the literal.

If the first two bits of the operation code define an arithmetic operator, the remaining six bits of the operator define the arithmetic operation to be performed. If the first two bits of the operation code define a name operator, then the next five bits define the operation to be performed. The remaining bits define whether the named object is contained in the top of the name stack slice and, then, the next eight bits give the displacement of the object within the slice.

The circuitry of program section 25 will now be described. Program buffer 44 serves to minimize main memory fetches by providing program strings to the processing module prior to initiating a memory fetch. The associated hardware of the program buffer 44 shall examine that buffer to determine if the branch address or contiguous program address resides in the program buffer. Buffer 44 shall have a maximum storage buffer capability of eight words each of which shall be 64 bits wide.

Program barrel circuit 43 performs the functions of alignment of inputs from program buffer 44, selection and isolation of an eight-bit operation code, selection and isolation of a variable length literal or name, and fan out of shifter outputs to all natural destinations. During alignment of inputs from program buffer 44, the inputs shall consist of two 64-bit words.

Program control 46, which may be of the type described in the above referred to Barnes et al. U.S. Pat. No. 3,401,376, provides the decoding and encoding mechanism, control mechanisms and timing mechanisms that are needed to perform the respective functions required to be performed by program section 25. Such functions include a determination of the class of operators specified by the program syllable and also the determination of the literal size specified by the literal operator. Another function is the translation of a name specified by the name operator in a terminal reference. The program control 46 also determines the operation to be performed as specified by a name operator or a general operator. It further controls the passing of arithmetic operation field of the arithmetic operator to arithmetic unit 20 of FIG. 2. Still another function is to insure that the necessary processor environment is present prior to the execution of the program syllable. Program control 46 also interacts with interrupt section 26, the arithmetic controls (not shown) and descriptor controls 39 to insure that the proper subsequence of operations is performed.

Interrupt section 26 receives externally generated interrupts and externally or internally generated faults for examination of such faults in accordance with a programmable set of masks. Program section 25 shall be notified of interrupts and unmasked faults in order to accomplish changes in the program being executed. The appropriate interrupt or fault routine may be called. The interpreter interrupt section 26 shall also inform the program section 25 when a conditional hault situation is reached.

C. Interpreter Structure Buffers

Each processor module in the system of the present invention can be functionally described utilizing only those structures which the kernel section 23 can evaluate. This permits the processor structure to be defined as a structure residing in level-1 (main memory) storage. This, in essence, guarantees that the amount of local buffering used in the processor will not influence the functional operation of the machine.

The basic processor structures are the resource control structure, the procedure control structure, the coroutine control structure, and the program control structure. These structures provide all the mechanisms required to manage the respective levels of storage, allocation of processors and the internal control of coroutine and procedure entry and return.

The system of the present invention may be described as a set of resources available to a number of competing processes. The management and allocation of these resources is distributed over a set of control processes each of which manages some subset of processes. The distribution of resources in the various processes which are created and controlled by a particular process is through the resource control structure.

One and only one resource control structure exists for each processor in the system. As the processor moves from process space to process space, the structure keeps a history of the resources being passed. As a process is called, the subset of resources the caller wishes to pass are placed in the resource structure for use by the called process. The called process may use these resources but may not change them. When a subprocess returns to the process that activated it, the resources which have been allocated for that subprocess are removed from the resource structure.

The different resources that may be described by entries in the resource control structure include descriptions of segment containers in level-1 memory, descriptions of segment containers in level-2 memory, descriptions of level-3 storage (the various I/O devices), description of the processor time, description of the fault masks, and description of the fault and interrupt registers.

The resource structure provides protection against the illegal use of resources by a process and the changing of resources which do not belong to a given process. This is accomplished by having the resource control structure outside of the addressing space of all processes except the interpreter management process.

The procedure control structure is provided for controlling the allocation of level-1 storage or passing parameters to procedures and functions, for allocating storage for local variables used within procedures, functions, and blocks. Such a structure may be effectively used by a number of higher-level languages.

The procedure control structure consists of a stack for storing descriptions of the data structures used by a program, and of a display stack for controlling the particular descriptions which are currently visable to the program. The procedure control structure shall consist of three interrelated stacks: a name stack, display stack and value stack. Interrelation of these stacks is evident at procedure call and return when the addressing environment of the procedure must be established. The respective stacks reside in level-1 memory although buffers for these respective stacks exist in the structure buffering section 24 as described in relation to FIGS. 2, 3 and 8. The name stack contains the descriptions, parameters and locals required at various procedure, function and block levels. Slices are built in the name stack so that parameters and locals may be addressed by name. Each slice contains descriptions of parameters for a given procedure, function or descriptions of locals for a given block. Each slice is defined as a lexic level. A description of each slice is contained in the display stack. A typical name consists of a lexic level and displacement; that is, an index into the display stack that will locate the proper name stack slice and an index into the name stack slice will locate the proper description in the name stack. Slices can be created and destroyed by procedure operators or by procedure call and return. Entries in the name stack area between the top of the stack and the top most slice are used for expression evaluation. These entries are only addressable on a last-in first-out basis. The top four entries in the expression evaluation area may be buffered in a local memory for fast access.

As illustrated in FIG. 8, the name stack buffer is four words of 128 bits each. The buffer is dynamically controlled on a usage basis. The size of this memory restricts the width of the name stack to 128 bits.

The display stack contains descriptions of name stack slices. These descriptions are entered into the display stack by a procedure call or by the slice operator. These descriptions are removed from the display stack by procedure return or by the unslice operator. Each entry in the display stack that is accessed will be checked to see if it is captured in the local associative memory of the display stack. If it is not captured then this entry is fetched from level-1 memory and replaces the oldest entry in the local memory. As illustrated in FIG. 8, the display buffers of the local memory includes eight words of 64 bits each.

The value stack stores arithmetic operands that are about to be used or that are the result of a computation. Each entry in the value stack is referenced by a data descriptor in the name stack. Values may be explictly named. The name references a descriptor in the name stack. In turn this description defines the desired entry in the value stack. Arithmetic operators which require values cause the top of the name stack to be examined to see if it references a value. Program operators which affect the contents of the name stack will also affect the contents of the value stack if the name stack entry references the value stack.

The value stack has slices that are created and destroyed concurrently with the name stack slices. These slices contain operands, constants and partial results of program execution at various lexic-levels.

Any or all of the top four entries in the value stack may be captured in the value stack buffer 42 as illustrated in FIG. 3. Buffer 42 is a local memory of four words of 256 bits each. The word size of 256 bits limits the size of a single operand for an arithmetic operation. The value stack buffer links automatically to the value stack in level-1 memory.

The coroutine control structure controls all routines that can exist concurrently but must be run consectively. Each coroutine is defined by procedure control structure and a program control structure which are named in the stack of the current structure. Structure descriptors are in consecutive locations in the name stack. This group of consecutive locations is referred to as the coroutine control field. This field for the routine currently being executed is contained in the descriptor buffer 40 as illustrated in FIGS. 3 and 8.

The coroutine structure is provided with a coroutine display description which shall reside in a fixed location in a process environment area. The coroutine display description defines the coroutine display which is a stack vector. The top entry in the coroutine display defines the active coroutine. The top entry shall contain a description of the parent's display and a name (i.e., lexic level and displacement) which, when applied to the parent display, finds the coroutine field of the active coroutine. The remaining entries in the coroutine display define the ancestry of active coroutines.

A coroutine can be evoked by a coroutine call operator. This operator has the name of the coroutine control field of the coroutine that is to be evoked. This name replaces the existing name in the top entry of the coroutine display. The hardware circuitry restores the coroutine control field of the existing coroutine into the name stack of the parent. The new coroutine control field is now captured in the descriptor buffer structure.

The coroutine activate operator establishes a new family of coroutines by placing a new entry in the top of the old coroutine display. The coroutine end operator removes the current family of coroutines by removing the top entry in the coroutine display. As indicated in FIG. 8, the coroutine control field buffer consists of a local memory of 12 words of 128 bits each and an associative memory of 12 words of 40 bits each.

The function of the coroutine control field buffer is to contain the control field of the current coroutine and the descriptions of the resource stack and the coroutine display. The descriptions are structure information that is referenced by the program operator, that is, the structures that are used by the program operators.

The associative memory 41 of FIG. 3 contains the level-1 address of each descriptor contained in the buffer in order that each up-dated descriptor can be restored quickly to level-1 storage.

Figure 10:
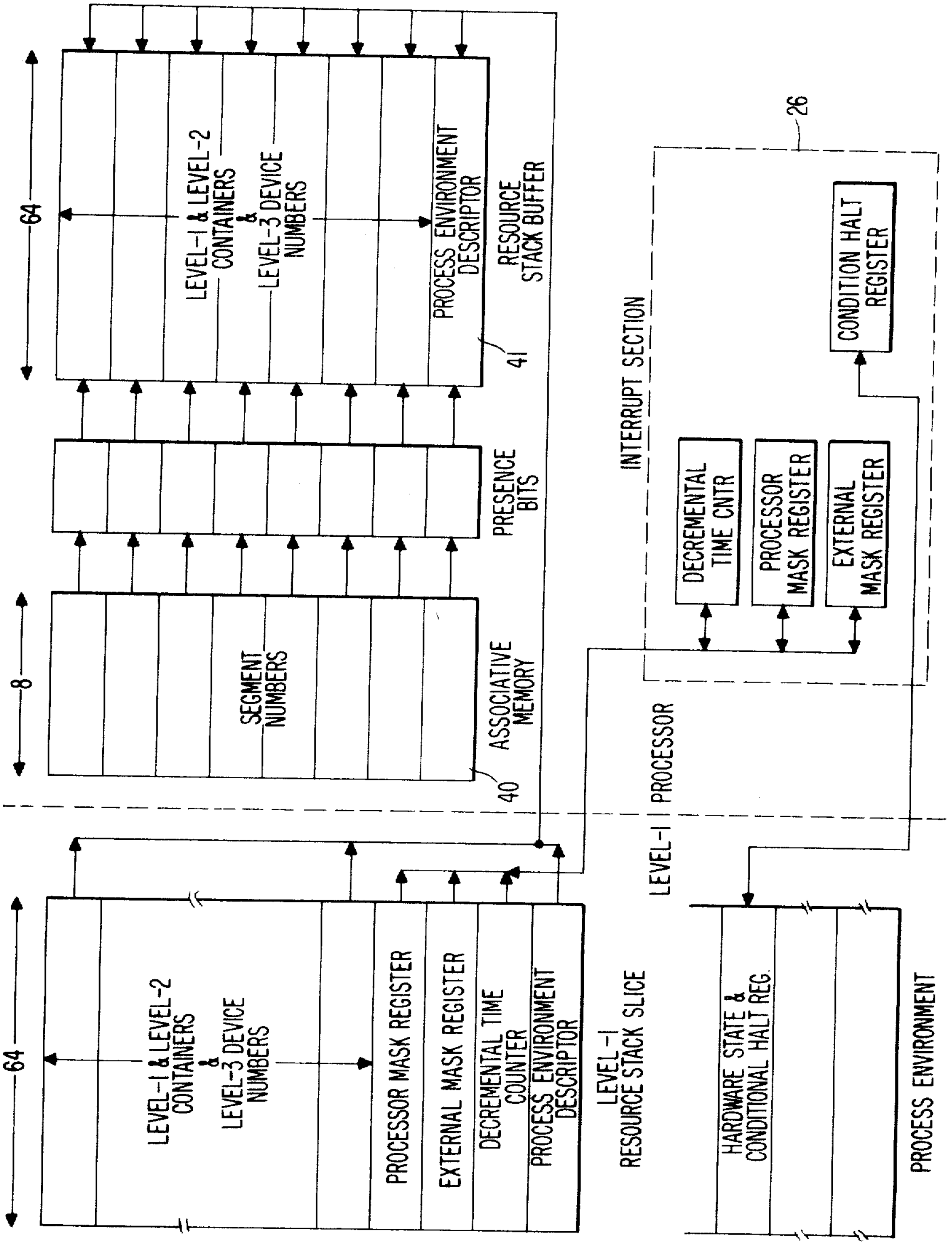
FIG. 10 is a schematic representation of information transfer between level-1 memory and the processor.

In order to illustrate the manner in which the contents of the various stacks are transferred to structure buffering section 24 of the processor, reference is now made to FIG. 10. As illustrated therein, the level-1 resource stack slice and process environment reside in main memory. The first entry in the resource stack slice contains the process environment descriptor which is then transferred to become the first entry in the resource stack buffer of structure buffer 40. The next three entries which contain the processor state information are placed in the appropriate registers in the interrupt section 26. These entries include the contents for processor mask register, external mask register and a decremental time counter.

The remaining entries which are level-1 containers, level-2 containers and level-3 device numbers are captured upon access in the resource stack portion of structure buffer 40. For each entry into buffer 40, there is a corresponding entry into the associative memory 41. The resource stack buffer in the process state is now set.

The method and apparatus thus described allow for the accessing of a hierarchy of nested structures within the system storage. To fully realize the advantages of such a system, it is desirable to have a free field storage. While it is not practical to build such a storage to be without word structure a word structured memory can appear to be free field in nature by the provision of an isolating unit between the storage and the rest of the system. Such a unit must be able to receive data segments from a memory requesting device and shift them to any desired orientation of contiguous bit locations in memory. In this manner data structures of any size can be stored in memory starting at any specified bit location. Such a memory system is described below.

D. Memory Modules

The primary function of memory modules 12 of FIG. 1 is to enable the requesting devices to extract fields of information or to insert fields of information anywhere within the memory system. A field of information is defined as any number of bits whose starting bit position may exist anywhere within the memory system. FIG. 1 shows the relationship of the memory modules 12 to the other devices in the system. There are three types of requesting devices: central processor modules 10, input/output module 18 and the memory extension controllers 14. The maximum number of memory modules that may be assigned to the system is preferable 16 and each memory module shall be capable of servicing any combination of a maximum of 16 requesting devices. The memory modules shall make no distinction between the requesting devices so that any operation performed for one requesting device can be performed for any other requesting device.

As indicated in FIG. 1, there are preferably 2 memory storage units 12 associated with each field isolation unit 13 to make up the complete memory module 11. However, in a particular system there may exist only one memory storage unit 12 with particular isolation unit 13. Each memory storage unit 12 will store information in a core memory stack although other forms of memory may be employed for the purpose of the present invention, and such unit shall have the capability of presenting this information upon request. Each memory storage unit 12 shall interface only with its own field isolation unit 13 so that all operations within the system shall first pass through a particular field isolation unit before being initiated.

Figure 12:
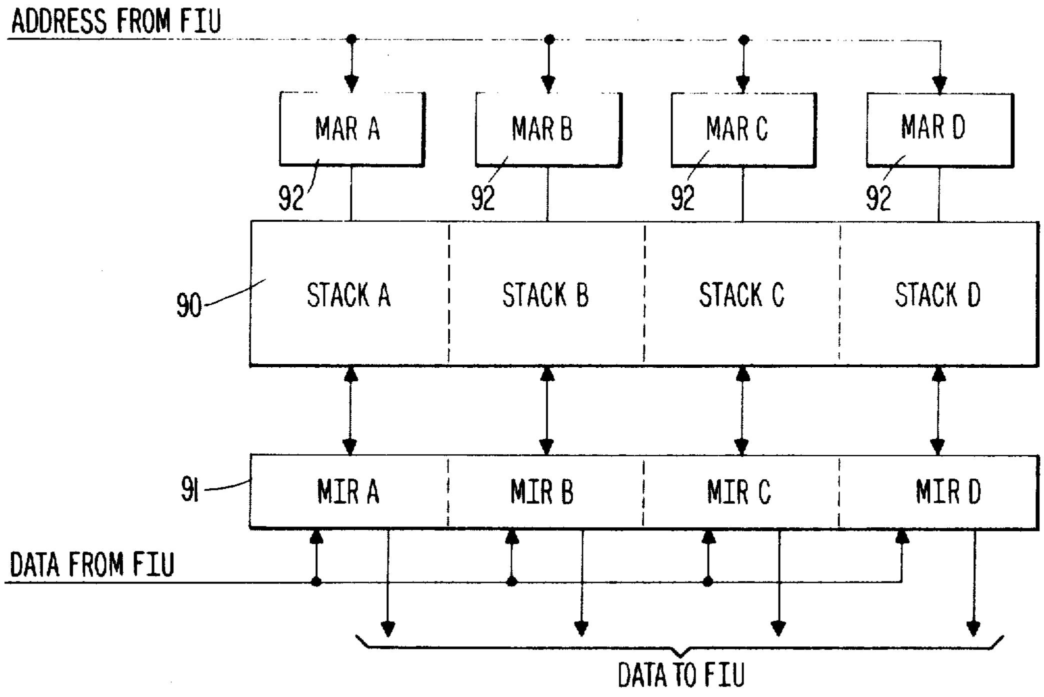
FIG. 12 is a schematic representation of a memory storage unit of FIG. 11.
Figure 11:
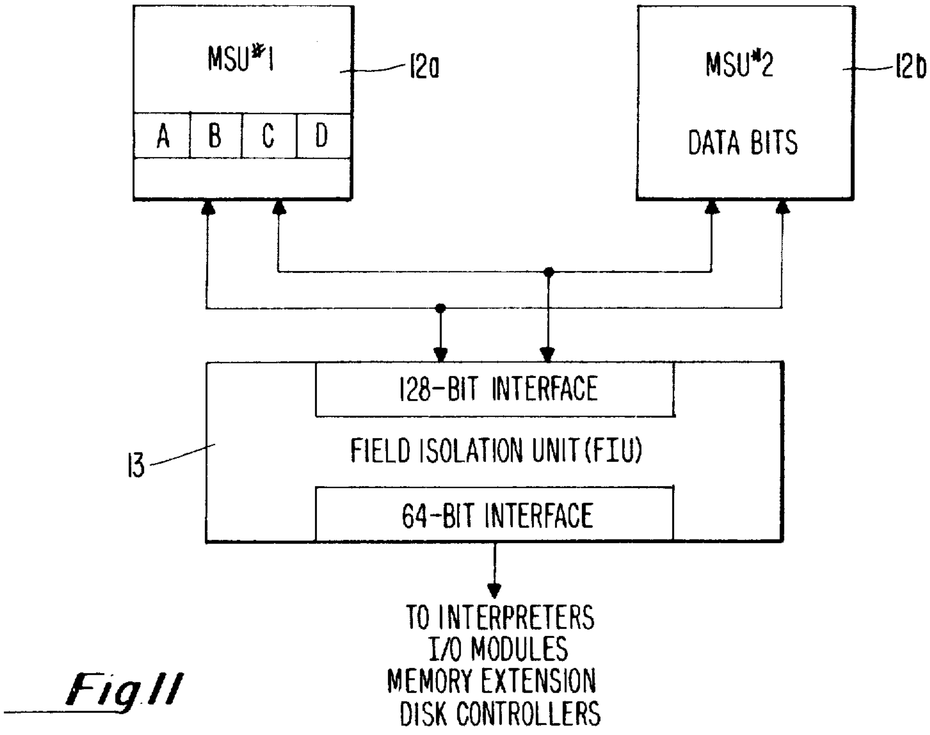
FIG. 11 is a schematic representation of a memory module of FIG. 1.

As indicated in FIGS. 11 and 12, each memory storage unit 12 is in fact structure oriented and divided into a plurality of stacks. Each memory stack is preferably made up of 8,192 locations, each of which contains 288 available bits of information. Out of these 288 bits, 256 shall be used by the system as memory space and the remaining 32 bits shall be used internally as error code information. The error code bit shall pertain only to the preceding 64 bits of information. Whenever information is stored within the memory, these error code bits shall be set according to the new information in the stack work.

E. Field Isolation Unit

Each field isolation unit 13 shall be provided with logic which provides the capability of extracting or inserting fields of information independent of memory structure. The memory shall therefore be treated by the requesting device as one continuous space having the ability to accept fields starting at any point (bit) and continuing for any prescribed length.

Figure 13:
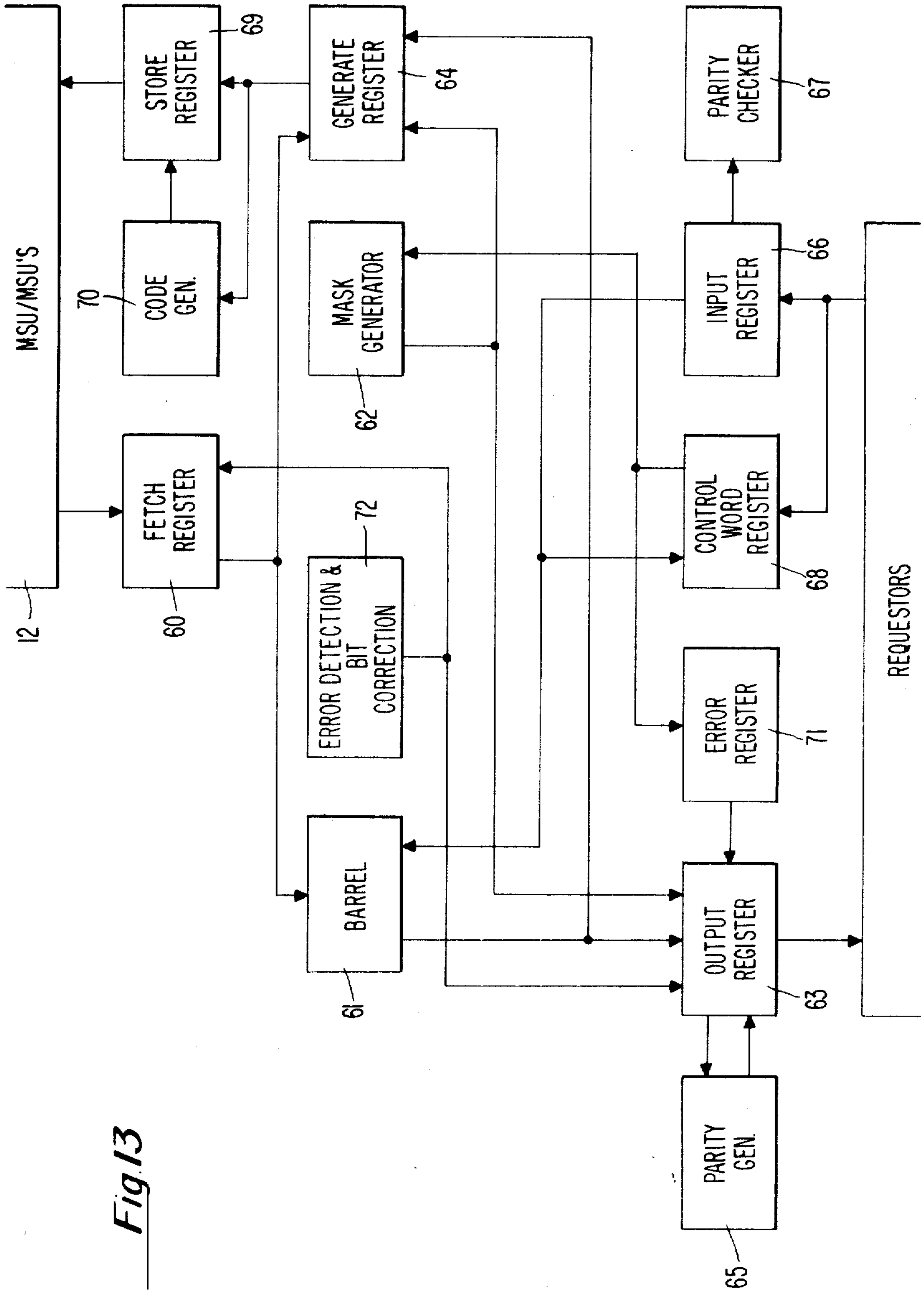
FIG. 13 is a schematic representation of a field isolation unit of FIG. 12.

Field isolation unit 13 consists of 13 major functional components which are interconnected. As shown in FIG. 13, fetch register 60 is a 144-bit register to be used to contain a copy of two memory words. Thus, the first set of 72 bits is a copy of the memory word that contains the present starting bit of a field, and the second set of 72 bits is a copy of the memory word that contains the continuation of a field. For example, if an operation specifies the starting bit to be bit 5 in memory word B and the length is more than 59 bits, the fetch register 60 would receive words B and C. During fetch operations, the fetch register 60 is used to present memory words to barrel logic 61 for field extraction. During the store operation, fetch register 60 is used to reinsert bits of a memory word which were not changed by the storing of a new field.

Barrel section 61 shall provide the shifting network which will have the capacity of shifting 128 bits of information left-end-around 0 to 127 bit locations places. During a fetch operation, barrel 61 is used to position the field so that the field is left justified or right justified before being transferred to the requesting device. During a store operation, barrel 61 is used to position the incoming data into the proper bit location of memory. Mask generator 61 provides the facilities for selecting a field from the barrel output circuitry and transferring the field into the output register 63 or into generate register 64. The selected field is determined by the starting bit and length field information provided in the control word and, also, by the type of operation requested. A disclosure of a particular shifting network which may be employed in the present invention is contained in Stokes et al patent application Ser. No. 789,886, filed Jan. 8, 1969 and assigned to assignee of the present invention.

Output register 63 is a 65-bit register and will be used to buffer information during a minimum of one clock period which information is transferred to the requesting device from the various logic circuits in the field isolation unit.

Parity generator 65 is employed to generate parity for all outgoing data words. A parity bit shall follow the data transmission by one clock period.

Input register 66 is a 65-bit register to be used to hold the control word for a parity check. Also, input register 66 will provide temporary buffering during a minimum of one clock period for data transfer from the requesting device.

Parity checker 67 is provided to check all incoming data words. A parity bit shall be received one clock period after the data transmission.

Control word register 68 is a 64-bit register to be used to contain the control word transmitted by the requesting device. While an operation is in progress, this register shall keep track of the exact starting position and the remaining field length of that operation.

Generate register 64 is a 128-bit register and will be used to combine the barrel section output with the fetch register output; the result is a memory word. Also, generate register 64 shall hold the memory word for a minimum of one clock period to enable the code generator to develop check code bits before the word is transferred into the store register.

Store register 69 is a 72-bit register and is used to provide temporary storage for data word which is to be stored at a location specified by proper memory address register 92 of FIG. 12.

Code generator 70 is provided to develop check bits for all information that will be stored in memory. The development of these check bits will establish a means of detecting bit failures between the field isolation unit 13 and memory 12.

Error register 71 is a 64-bit register and will be used to contain all pertinent information necessary to identify and define a failure, such as, external failure (failure caused by the requesting device), internal failure (failure detected within the field isolation unit logic) and memory storage failure (failure due to incorrect stack information).

When words are received from fetch register 60, they contain a total of 72 bits each. The 64 most significant bits are data bits and the remaining eight bits are check code bits. These check code bits allow the detector and bit correction section 72 to detect one-bit error or a two-bit error. If a one bit error occurs, the bit will be corrected before the field is transmitted. If a two-bit error occurs, no correction is possible. In either case the requesting device will be notified of the failure and what type error occurred.

F. Memory — FIU Interface

Figure 14:
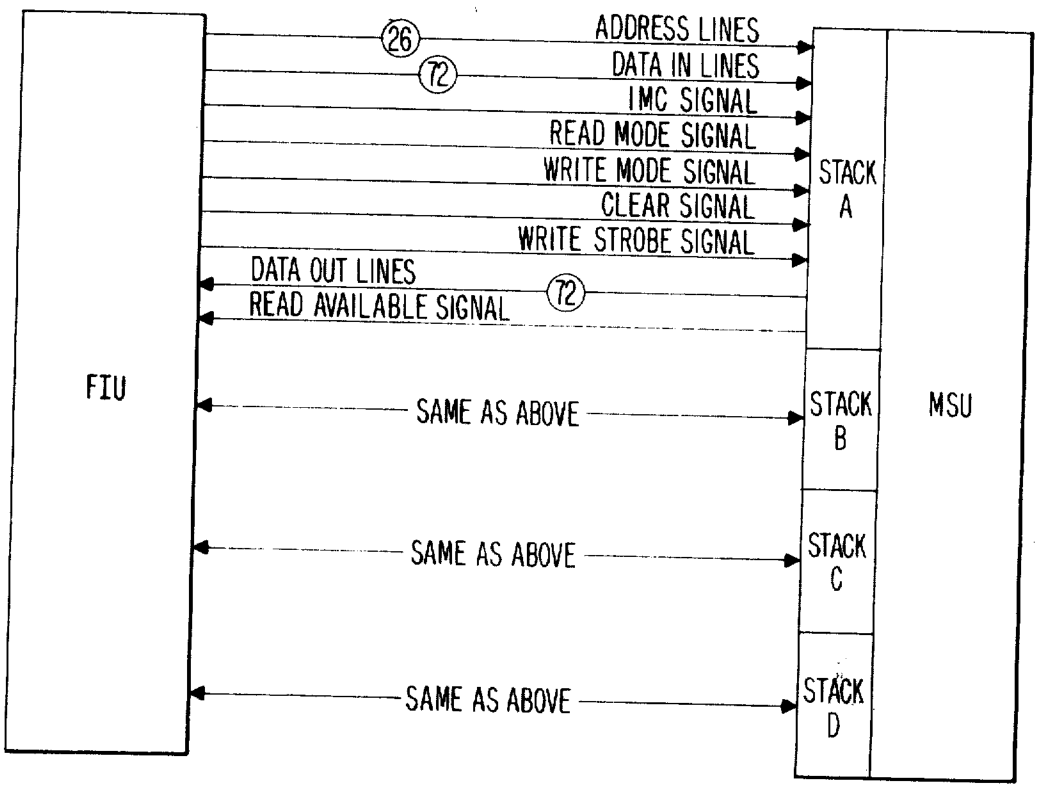
FIG. 14 is a representation of the interface between a memory storage unit and a field isolation unit.

Having thus described both the respective memory storage unit 12 and the field isolation unit 13, the interface between these two units will now be described in reference to FIG. 14. This interface includes both control lines, address lines and data lines. As illustrated in FIG. 14, the interface is repetitious in the sense that the same types of transmission lines are presented to each of the respective four stacks in which each of the memory storage units 12 is organized as was discussed in relation to FIGS. 11 and 12.

As illustrated in FIG. 14, the interface to stack A includes 26 address lines which are used to transfer a 13-bit address that may specify one of the 8,192 memory locations. Interface for addressing contains 26 lines since the memory storage unit 12 requires one and zero digits for each address bit.

There are 72 data in lines which are used to transfer data information that is to be inserted into an address memory location. Correspondingly, there are 72 data out lines which are used to transfer a copy of the contents (72 bits) read from the addressed memory location to the field isolation unit.

The remaining control lines include IMC line which provides the signal to initiate the memory cycle and a read mode signal which is employed to enable the transfer data from an addressed memory location to the memory information register 91 as illustrated in FIG. 12. The write mode signal is employed to enable the transfer of data from FIU 13 to memory information register 91. Clear signal is employed to clear the memory information register prior to data insertion. The write strobe signal is employed to strobe data into the memory information register 91 which makes it available to an addressed location. Read available signal is employed to inform the field isolation unit 13 that data read from the address memory location is present in memory information register 91.

G. Requestor — FIU Interface

Figure 15:
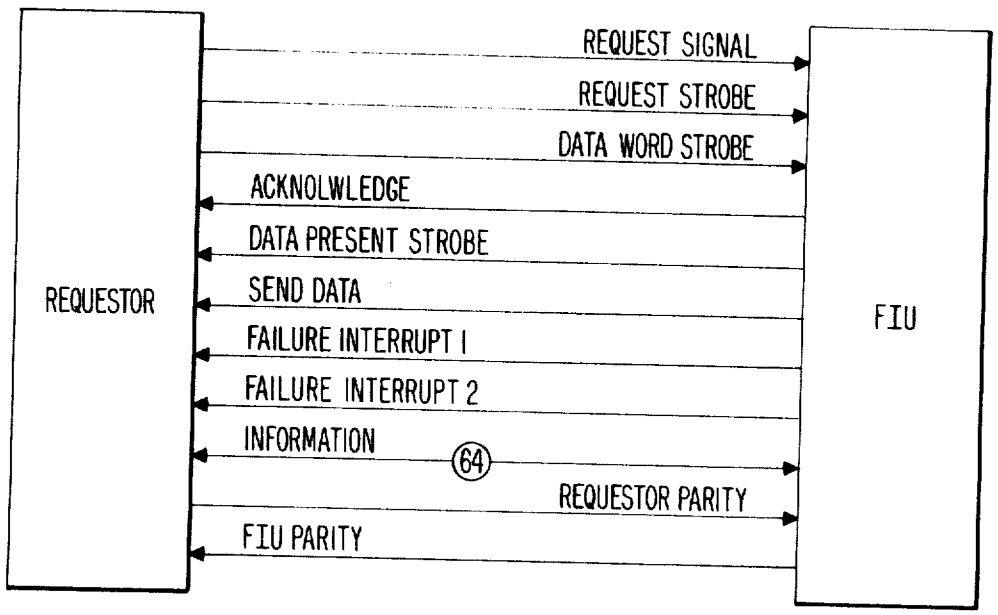
FIG. 15 is a representation of an interface between a field isolation unit and a requesting device.

The interface between field isolation unit 13 and each of the respective requestors is illustrated in FIG. 15 which includes a 64-bit information bus which is bidirectional and employed to transfer both data and control words. The bus is bidirectional in that the information may be transferred either from the field isolation unit to the requestor or from the requestor to the field isolation unit. A minimum of one clock period of dead time is required between consecutive operations whenever the situation is reversed.

The control lines as illustrated in FIG. 9 include a request signal line which supplies a request signal sent by the requestor to select a specific field isolation unit. It must go true one clock period preceding the request strobe and remain true until the first acknowledged signal is received from the field isolation unit. A request strobe signal is sent to inform the field isolation unit that a control word is being transmitted over the information line. Initially, the request strobe goes true one clock period after the request signal goes true and will remain true for one clock period before the control word is sent over the information line. It must remain true until a first acknowledged signal is received for any fetch operation or any store operation the field length of which is greater than 64 bits. The request strobe must be true for one clock period and proceed each transmission of the control word by one clock period for any strobe whose field length is equal to or less than 64 bits.

A data strobe signal is sent to inform the field isolation unit that a data word is to be transmitted over the information line. If the field length of the data word is greater than 64 bits, the data word strobe signal will follow the "send data signal." If the field length of the data word is equal to or less than 64 bits, the data word strobe signal will be sent automatically after the request strobe signal and will be one clock period in duration.

An acknowledge signal of one single clock period pulse is always transmitted to the requestor when service of the requestor is initiated. The requestor, however, must realize that the reception of the first acknowledge does not guarantee the operation will be performed.

A data presence strobe is sent to inform the requestor that a data word is present in input register 66 of the field isolation unit (See FIG. 13). The data presence signal is transmitted in coincidence with the data word for all fetch operations as long as no errors are detected in the read outs from the memory storage unit 12. It should be noted that the data present strobe is not the same as the data word strobe transmitted by the requestor. The data present strobe indicates a valid data word has been transmitted from the field isolation unit.

A send data signal is sent to the requestor whenever the field length of any store operation is greater than 64 bits. Each clock period that the send data signal is true, indicates to the requestor that it must send a data word strobe before it sends a data word. This method of control is necessary to eliminate the need of the requestor to know whether the field isolation unit has a minimum or a maximum memory storage unit configuration.

Failure interrupt one signal informs the requestor that at least one of the following types of errors have been detected by the field isolation unit. The failure interrupt signal is two clocks in duration and is sent to the requesting device that initiated the operation. The types of errors are: two bit error in read out from the memory storage unit, parity error in the control word, illegal operation code in the control word, wrong field isolation unit address in the control word, incorrect number of data word strobes in a store operation, parity error in the requestor data word and internal error.

Failure interrupt two signal informs the requestor that the field isolation unit has detected a one-bit error in a read out from the memory storage unit. The failure interrupt two signal is two clocks in duration and is sent to the requesting device that initiated the operation.

The requestor parity line is used to transfer the delayed parity bit for any requestor transmission to the field isolation unit. The delayed parity bit lists always follow the transmitted word by one clock period and must be a minimum of one clock period in width.

H. Processor Memory Interface Unit

Figure 16:
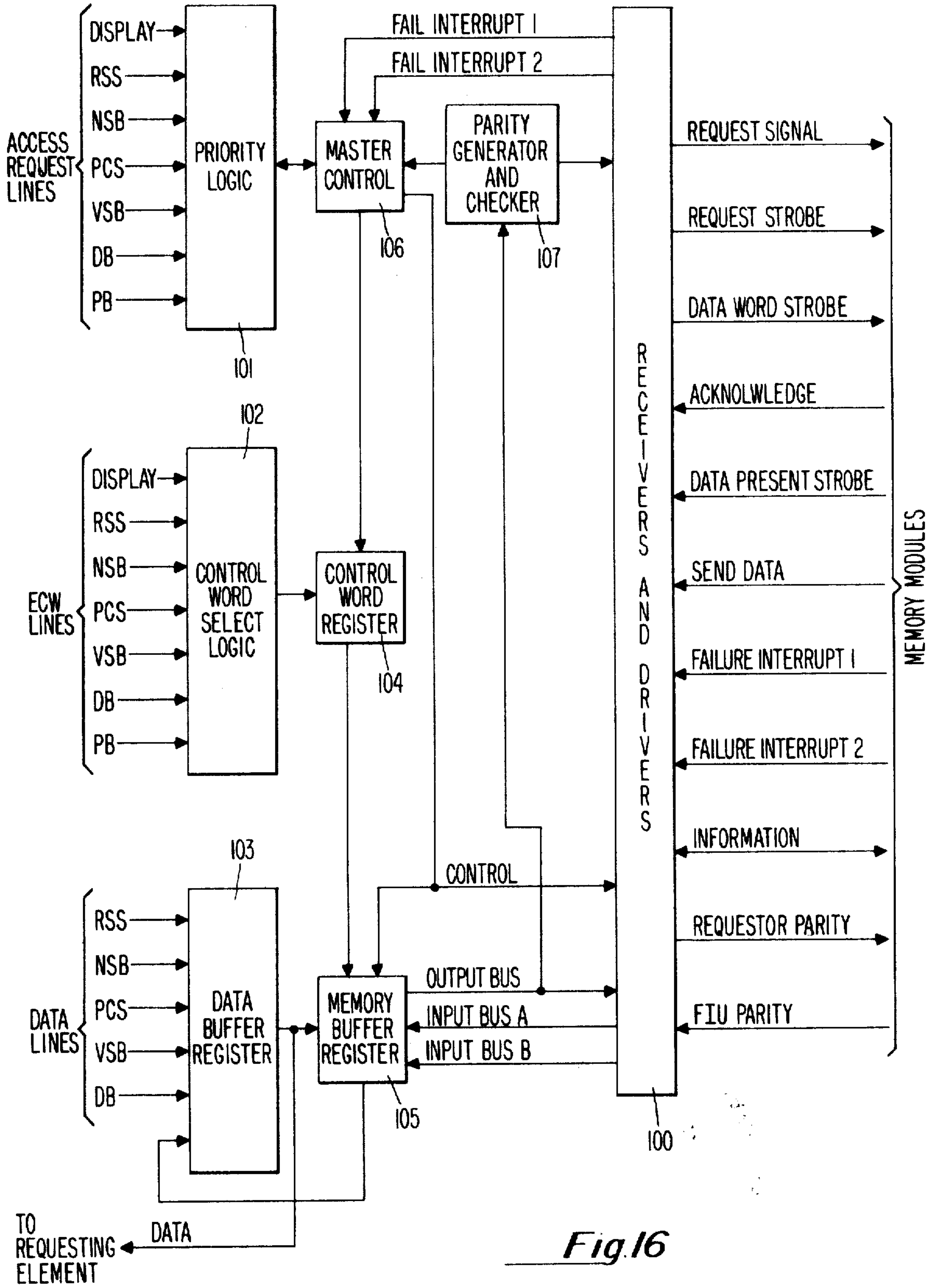
FIG. 16 is a schematic representation of the memory interface unit of a processor of FIG. 2.

The requestor side of the requestor-field isolation unit interface will now be described with relation to FIG. 16. It will be remembered that the field isolation unit can receive and transmit data or control words to any requestor be it a processor, an I/O control unit or the memory extension controller for the level-2 store. However, in FIG. 16, the circuitry illustrated is that which is particularly adapted for processing units. Thus the circuitry of FIG. 16 represents the memory interface unit 22 as illustrated in FIGS. 2 and 3.

Memory interface unit 22 (MIU) performs all transfers between the processor and any of up to a maximum of 16 memory modules 11. The MIU handles all data transfers as field-oriented operations and shall manage the memory access requests by the functional elements of the processor on a preassigned priority basis. The access priority assignment shall be specified by the processor and shall be typically involved with the following elements: display, resource stack slice, name stack buffer, program control stack, value stack buffer, description buffer, and program buffer.

Figure 6:
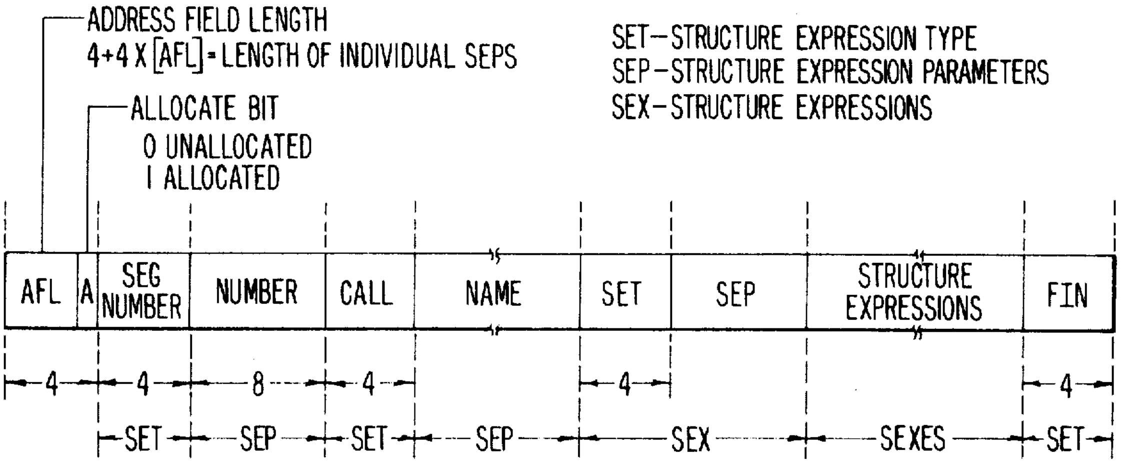
FIG. 6 is a representation of a string of structure expressions as might exist in a descriptor.
Figure 17:
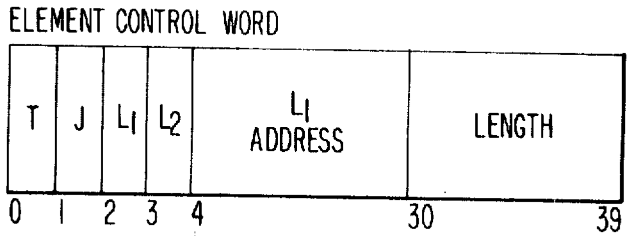
FIG. 17 is a representation of the element control word format.
Figure 18:
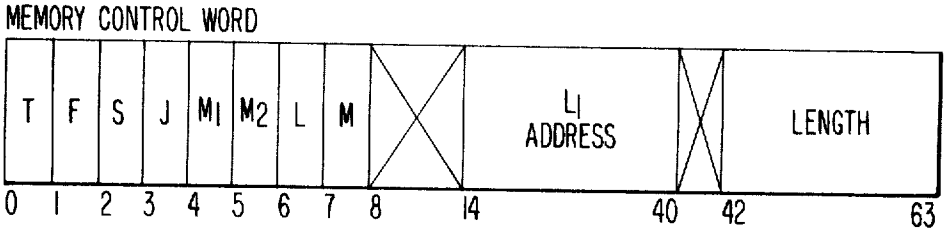
FIG. 18 is a representation of a memory control word format.

When one of the functional elements of interpreter 21 requires the services of MIU 22, it shall be required to raise its "access request" line to the MIU and place an element control word (ECW) as illustrated in FIG. 17 on a corresponding ECW line. Each of the respective ECW lines from the respective elements are supplied to control word select logic 102 as illustrated in FIG. 6. When requesting element has priority, the MIU shall load the element control word into its control word register 104 and determine which of the following operations is specified: a single word (field length less than 64 bits) store operation, a multiple word (field length greater than 64 bits) store operation, or a fetch operation.

DATA STRUCTURES

The various type instructions in each of the descriptor structure expressions will now be discussed. They refer to the various structures in memory.

The field type instruction references a subfield within the container by specification of the address, A, of the initial bit and the length, L, of the subfield. The variable-field instruction similarly references a field but the address and the length are parametric.

The vector type instruction refers to a field which is a single element of a set of contiguous, equal-size elements by means of a parametric subscript, the address, A, of the first element, and the elemental length, L.

The stack instruction and the push down instruction are used for last-in first-out contiguous structures with fixed-size and variable-size elements, respectively. During the construct mode, either instruction defines a reference to the top element of the structure with the address coupled (A, L). In the remove mode, either instruction defines a reference to an element defined by (A minus L, L). In the enter mode, either instruction defines a reference to an element defined by (A plus L, L). Element length is a parameter for accesses into push down structures in the enter mode. Access to stack and push down structures cause faults on overflow or underflow conditions.

The queue and variable-length queue instructions are used for first-in first-out contiguous structures with fixed size and variable sized elements, respectively. Access to the first or last element of either structure is made using the remove mode or enter mode, respectively. Element length is a parameter for accesses into variable length queue structures in enter mode. Accesses to both types of queue structures cause faults on queue full or empty conditions.

The list instruction defines references to elements of a linked list of equal-size elements. Allocation and deallocation are achieved by use of a free list which resides with the list structure in a container field. An access to the list structure in the construct mode results in a reference to the list element. A header pointer, A, current element pointer, P, and a pointer, Q, to the element which precedes the current element are a part of the list structure state.

The composite structures, push-down stack and pushdown pushdown, are structures similar to certain hardware structures of the central processor and deal with coarse over a fine structure. The purpose of presenting these composite structures here is to make formal their use in the hardware. Thus they are not structure instructions usable in descriptions by software but certain operations can be better understood by a familarity with these structures.

Composite structures have properties similar to those of cospacial structures in that both consist of multiple structures over a single container field. However, composite structure accesses have additional provisions for updating the structure state of all of the structures in the composite structure. Composite structures are also expressable by their coarse, fine or composite name. For example, with a single access to a push-down stack, a change in the states of both push-down and the stack, or just the push-down, or just the stack, can be affected by selection of the appropriate name within the structure. In particular, a remove mode access with a push-down stack instruction results in a single operation equivalent to a remove of the push-down element and a number of removes to the stack structure equal to the number of fine elements contained by the push-down element. The push-down push-down algorithm provides action similar to the push-down stack but with the fine structure being a push-down instead of a stack.

The stack-vector instruction provides indexing operations into a vector of stack elements. Vector accesses in a stack-vector structure are bounded by the stack. The stack element and the vector element are of equal size, in contrast to the fine-coarse sizes of the other composites.

The call instruction evaluates a description by specifying the name of the description to be evaluated. A return occurs when the evaluation of the call description is complete.

At the completion of the structure expression the interpreter attributes are copied into their terminal description. This completes the evaluation operation.

STRUCTURE OPERATORS AND ALGORITHMS

The structure operators are construct, enter and remove. The construct operation fetches the named descriptor and builds a reference by executing the description. The execution sequence depends upon the structure expression types within the description. The enter operation fetches the named descriptor, finds the innermost structure, allocates a field in the innermost structure, and builds a terminal reference to the newly allocated field in the top of the name stack. The remove operation fetches the named descriptors, finds the innermost structure and builds a terminal reference to the newly reallocated field in the top of the name stack.

Structure expression evaluation algorithms will now be discussed. These are the algorithms which are used by the interpreter for the evaluation of the descriptor structure expression. Evaluation of all structure expressions except the last one in the descriptor is done with the construct operator. Structure expressions pertaining to data structures which have no provision for allocation or deallocation of space are always evaluated by the construct operator. When the structure expression is of the type segment number, the number field is used as an index into the resource stack slice to locate the appropriate storage level container or device. A structure expression of the type finish (Fin) indicates the end of the descriptor expression string. It results in a transfer of the container field from the attributes stack to the top of the name stack.

As illustrated in FIG. 6, the structure expression field can be a variable number of different structure expressions that might be required to perform any given routine. The respective expressions are evaluated from left to right.

The vector construct algorithm constructs a reference in the attribute stack to an element, the vector being a sequence of equal length contiguous each of which is addressed by an index value. The index value multiplied by the length of the element is added to the location field of the container of the vector to give the location field of the desired element.

The field construct algorithms builds a reference to a field which is an element that is treated as if it had no substructure. The variable field construct algorithm is similar to that of the field construct algorithm.

The stack enter algorithm allocates a field in the stack and builds a reference to that field. The stack is a storage area such that items entered into it can be removed only in a first-in last-out order and contains a set of contiguous equal length elements. Similarly, the stack remove algorithm deal-locates a field in the stack. The stack construct algorithm builds a reference to a field in the stack. The stack-vector algorithms are similar to the stack algorithms except that in the stack-vector construct algorithm, each element in the vector is accessed by an index value as explained above.

The queue-enter algorithm allocates a field in a queue which is a container element which is partitioned into allocated free space. The allocation rule is first-in first-out. The queue remove algorithm deallocates a field in the named queue. The queue construct algorithm builds a reference to an element in the queue.

The linked list enter algorithm allocates a field in the named linked list which is a container element partitioned into a set of allocated elements and a free space. Each allocated element (or list element) is partitioned into a linked element and an information element. Each linked element is a set of references which define the path to the logically adjacent list element. The linked list remove algorithm is employed to deallocate a field in the linked list. The linked list construct mode builds a reference in the attribute stack. The linked list sequence mode and the linked list reset algorithm complete this set.

The push down enter algorithm allocates a field in a push down stack which is a stack of variable height and length elements. The push down remove algorithm similarly deallocates a field in the push down. The push down construct mode builds a reference in the attribute stack to the desired element.

While particular embodiments of the present invention have been described and illustrated, it will be apparent to those skilled in the art that changes and modifications may be made therein without departure from the spirit and scope of the invention as claimed.

What is claimed is:

1. In an information processing system having a storage system to receive a plurality of nested data structures each of which is defined by an expression of an initial address relative to the initial address of a parent structure and a length count of contiguous addresses; address preparation means to evaluate said expressions and prepare an absolute structure address, said means comprising:

a buffer register mean to receive a descriptor constructed of a plurality of said expressions respectively representing a parent data structure and successive subdata structures each of which is contained in a preceding structure;

first register means for receiving a containing structure address;

second register means for receiving a subsequent structure address;

switching means to successively receive said expressions from said buffer register means and to transfer said parent structure address to said first register means and the next successive structure address to said second register means; and combining means for receiving the respective structure addresses from said first and second register means and forming an interim structure address as a function of said containing structure address and said subsequent structure address, and transferring the structure address thus formed to said first register means;

said switching means being successively activated to transfer a new subsequent structure address to said second register means after the transfer of said interim structure address to said first register means, successive activation continuing until all of the expressions of the descriptor have been evaluated whereupon the contents of said first register means contains an absolute structure address.

2. Address preparation means according to claim 1 including:

third register means to receive a containing structure length count; and fourth register means to receive a subsequent structure length count.

3. Address preparation means according to claim 2 wherein:

said switching means includes insertion-extraction means to receive said structure expressions for extraction therefrom and transmission, to the respective registers, of said containing structure address, said containing structure length count, said subsequent structure address and said subsequent structure length count.

4. Address preparation means according to claim 1 wherein:

said address combining means includes circuit means responsive to operation signals to form an interim structure address as the sum of said containing structure address and said subsequent structure address.

5. Address preparation means according to claim 2 wherein:

one said expression includes an index fraction designation; and said address combining means includes circuit means responsive to operation signals to form an interim structure address as the sum of said containing structure address, said subsequent structure address and the product of said index fraction and the subsequent length count.

6. Address preparation means according to claim 2 wherein:

said address combining means includes circuit means responsive to operation signals to form an interim structure address as the sum of said containing structure address, said subsequent structure address and said subsequent length count.

7. Address preparation means according to claim 2 wherein:

said address combining means includes circuit means responsive to operation signals to form an interim structure address as the sum of said containing structure address and said subsequent structure address less said subsequent length count.

8. In an information processing system having a storage system to receive a plurality of nested data structures each of which is defined by an expression of an initial address and a length count of contiguous addresses; address preparation means to evaluate said expressions and prepare an absolute structure address, said means comprising:

a buffer register to receive a descriptor constructed of a plurality of said expressions respectively representing a parent data structure and successive subdata structures each of which is contained in a preceding structure;

first register means for receiving a containing structure address;

second register means for receiving a subsequent structure address;

switching means to successively receive said expressions and to transfer said parent structure address to said first register means and the next successive structure address to said second register means; and combining means for receiving from said first and second register means the respective structure addresses and forming an interim structure address as a function of said containing structure address and said subsequent structure address, and transferring the structure address thus formed to said first register means;

said storage system including a free field memory addressible to any individual bit location, said addresses and said length counts defining data structures beginning at any individual bit location and continuing for any specified member of bit locations within the parent data structure;

said switching means being successively activated to transfer a new subsequent structure address to said second register means after the transfer of said interim structure address to said first register means, successive activation continuing until all of the expressions of the descriptor have been evaluated whereupon the contents of said first register means contains an absolute structure address.

9. Address preparation means according to claim 8 wherein:

said address combining means includes circuit means responsive to operation signals to form an interim structure bit address as the sum of said containing structure bit address and said subsequent structure bit address.

10. Address preparation means according to claim 8 wherein:

one said expression includes an index fraction designation; and said address combining means includes circuit means responsive to operation signals to form an interim structure address as the sum of said containing structure address, said subsequent structure address and the product of said index fraction and the subsequent length count.

11. Address preparation means according to claim 8 wherein:

said address combining means includes circuit means responsive to operation signals to form an interim structure bit address as the sum of said containing structure bit address, said subsequent structure bit address and said subsequent length bit count.

12. Address preparation means according to claim 8 wherein:

said address combining means includes circuit means responsive to operation signals to form an interim structure bit address as the sum of said containing structure bit address and said subsequent bit structure address less said subsequent length bit count.

13. In an information processing system to process nested data structures each of which is defined by an expression of an initial address relative to the initial address of a parent structure and a length count of contiguous addresses; the combination comprising:

a storage system including a free field memory addressable to any individual bit location, said addresses and said length counts defining data structures beginning at any individual bit location and continuing for any specified number of bit locations within the parent data structure;

first and second register means to respectively receive an expression having an address of a data substructure relative to said parent structure address; and combining means to form an actual address of said substructure as a function of said parent and substructure addresses;

said combining means being responsive to an operation signal to form a new actual address as a function of the previous actual address and the address of a subsequent data substructure.

14. In an information processing system to process nested data structures each of which is defined by an expression of an initial address relative to the initial address of a parent structure and a length count of contiguous addresses; the combination comprising:

a storage system including a free field memory addressable to any individual bit location, said addresses and said length counts defining data structures beginning at any individual bit location and continuing for any specified number of bit locations within the parent data structure;

first and second register means to respectively receive an expression having a parent data structure address and an expression having an address of a data substructure relative to said parent structure address;

combining means to form an actual address of said substructure as a function of said parent and substructure addresses;

switching means to receive an expression of a parent data structure address and an expression of an address of a data substructure within said parent structure; and a plurality of buffer registers to receive a sequence of such expressions for later transfer to said switching means.

* * * * *